United States Patent
Endoh et al.

(10) Patent No.: US 8,652,256 B2
(45) Date of Patent: Feb. 18, 2014

(54) MANUFACTURING APPARATUS OF POLYCRYSTALLINE SILICON

(75) Inventors: Toshihide Endoh, Suzuka (JP); Masayuki Tebakari, Suzuka (JP); Toshiyuki Ishii, Yokkaichi (JP); Masaaki Sakaguchi, Suzuka (JP)

(73) Assignee: Mitsubishi Materials Corporation, Tokyo (JP)

( * ) Notice: Subject to any disclaimer, the term of this patent is extended or adjusted under 35 U.S.C. 154(b) by 830 days.

(21) Appl. No.: 12/555,085

(22) Filed: Sep. 8, 2009

(65) Prior Publication Data

US 2010/0058988 A1 Mar. 11, 2010

(30) Foreign Application Priority Data

Sep. 9, 2008 (JP) .................................. 2008-231163

(51) Int. Cl.
*C30B 25/00* (2006.01)
(52) U.S. Cl.
USPC ................. 117/200; 117/84; 117/88; 117/99; 117/204; 118/715; 118/722; 118/724
(58) Field of Classification Search
USPC ............... 117/88, 200, 911, 935, 84, 99, 204; 118/715, 722, 724
See application file for complete search history.

(56) References Cited

U.S. PATENT DOCUMENTS

| | | | |
|---|---|---|---|
| 2,999,735 A | * | 9/1961 | Reuschel ....................... 423/350 |
| 4,030,963 A | * | 6/1977 | Gibson et al. .................. 117/50 |
| 4,805,556 A | | 2/1989 | Hagan et al. |
| 5,593,465 A | | 1/1997 | Seifert et al. |
| 6,221,155 B1 | * | 4/2001 | Keck et al. ..................... 117/200 |

FOREIGN PATENT DOCUMENTS

| | | | |
|---|---|---|---|
| BE | 826 870 A1 | | 7/1975 |
| BE | 826 870 A1 | * | 7/1975 |
| DE | 24 35 174 A1 | | 2/1976 |
| EP | 2 108619 A2 | | 10/2009 |
| EP | 2 138 459 A1 | | 12/2009 |
| JP | 08-045847 A | | 2/1996 |
| JP | 2002-508294 | | 3/2002 |
| JP | 2002338226 A | * | 11/2002 |

OTHER PUBLICATIONS

Extended European Search Report issued on Nov. 9, 2010, for European Patent Application No. 09169429.9.

* cited by examiner

*Primary Examiner* — Michael Kornakov
*Assistant Examiner* — Kenneth A Bratland, Jr.
(74) *Attorney, Agent, or Firm* — Edwards Wildman Palmer LLP

(57) ABSTRACT

A manufacturing apparatus of polycrystalline silicon products polycrystalline silicon by depositing on a surface of a silicon seed rod by supplying raw-material gas to the heated silicon seed rod provided vertically in a reactor, includes: an electrode which holds the silicon seed rod and is made of carbon; an electrode holder which holds the electrode, and cooled by coolant medium flowing therein, wherein the electrode includes: a seed rod holding member which holds the silicon seed rod; a heat cap which is provided between the seed rod holding member and the electrode holder; and a cap protector having a ring-like plate shape, which covers an upper surface of the heat cap, and in which a through hole penetrating the lower-end portion of the seed rod holding member is formed.

4 Claims, 4 Drawing Sheets

MANUFACTURING APPARATUS OF POLYCRYSTALLINE SILICON

BACKGROUND OF THE INVENTION

1. Field of the Invention

The present invention relates to a manufacturing apparatus of polycrystalline silicon that products rods of polycrystalline silicon by depositing polycrystalline silicon on surfaces of heated silicon seed rods.

Priority is claimed on Japanese Patent Application No. 2008-231163, filed Sep. 9, 2008, the content of which is incorporated herein by reference.

2. Description of the Related Art

Conventionally, a manufacturing apparatus of polycrystalline silicon by the Siemens process is known. In the manufacturing apparatus of polycrystalline silicon by the Siemens process, a plurality of silicon seed rods are provided in a reactor and heated. Raw-material gas including chlorosilane gas and hydrogen gas is supplied into the reactor and in contact with the heated silicon seed rods, so that polycrystalline silicon is deposited on the surface of the silicon seed rods by thermal decomposition and hydrogen reduction of the raw-material gas.

In this manufacturing apparatus of the polycrystalline silicon, the silicon seed rods are fixed on electrodes provided on a bottom plate portion of the reactor so as to stand on the electrodes. Electric current is supplied to the silicon seed rods via the electrodes, so that the silicon seed rods are heated by the electric resistance. The raw-material gas is blown up from below and in contact with the silicon seed rods. As a result, rods of polycrystalline silicon are manufactured. The electrodes which hold the silicon seed rods are distributed across the inner-bottom surface of the reactor. For example, as disclosed in Japanese Unexamined Patent Application, First Publication No. H08-45847, a base plate (i.e., a bottom plate portion) having through-holes is provided in a deposition apparatus (i.e., a reactor). Electric lead portions are fixed in the through-holes so as to be surrounded by circular insulators. Electrode holders are attached to the electric lead portions. Graphite electrodes are held on the upper end portions of the electrode holders.

In a process of depositing polycrystalline silicon on the surfaces of the silicon seed rods by reacting the raw-material gas in the reactor, the deposited polycrystalline silicon reach several tens of kg by continuation of the reaction, and may peel off due to self weight. In this case, the fallen polycrystalline silicon may damage a furnace floor of the reactor, or may short-circuit between the electrodes and the furnace floor, so that the reaction is prevented from continuing.

Especially, in the apparatus of JP'847, the electrode holders are cooled since the electric lead portions are cooled. Therefore, the graphite electrodes are cooled, so that the temperature of the lower end portions of carrier members (i.e., silicon seed rods) are down. As a result, polycrystalline silicon is not deposited enough on these portions.

BRIEF SUMMARY OF THE INVENTION

The present invention is achieved in consideration of the above circumstances, and has an object to provide a manufacturing apparatus in which polycrystalline silicon can be deposited enough on the lower end portion of the silicon seed rod.

In order to achieve the above object, a manufacturing apparatus of polycrystalline silicon according to the present invention products polycrystalline silicon by supplying raw-material gas to a heated silicon seed rod provided vertically in a reactor so as to deposit the polycrystalline silicon on a surface of the silicon seed rod. The manufacturing apparatus includes: an electrode which holds the silicon seed rod and is made of carbon; and an electrode holder which is inserted and held in a through hole formed on a bottom plate portion of the reactor, and which holds the electrode. In the manufacturing apparatus, a coolant passage in which coolant medium flows therein is formed in the electrode holder. The electrode includes: a columnar seed rod holding member which holds a lower-end portion of the silicon seed rod; a heat cap which is provided between the seed rod holding member and the electrode holder, and which has a hollow portion in which a lower-end portion of the seed rod holding member is inserted so as to be held therein; and a cap protector having a ring-like plate shape, which covers an upper surface of the heat cap, and in which a through hole penetrated by the lower-end portion of the seed rod holding member is formed.

According to the present invention, it is hard to cool the seed rod holding member since the heat cap is interposed between the seed rod holding member and the electrode holder. Therefore, polycrystalline silicon can be deposited on the entire surface of the silicon seed rod and the lower-end portion of the seed rod holding member. As a result, the polycrystalline silicon which is deposited on the silicon seed rod is strongly supported by the polycrystalline silicon which is deposited on the seed rod holding member. In this case, although the polycrystalline silicon is deposited on the cap protector, the polycrystalline silicon is prevented from adhering to the heat cap since the heat cap is covered by the cap protector. Therefore, it is easy to reuse the electrode members such as the heat cap and the like.

In this manufacturing apparatus of polycrystalline silicon, it is preferable that a male screw portion be formed on an outer peripheral surface of the seed rod holding member, and female screws which screw together with the male screw portion be formed on inner peripheral surfaces of the hollow portion of the heat cap and the through hole of the cap protector.

In this case, the seed rod holding member is surely fixed to the heat cap since the heat cap and the cap protector behave as a double-nut with respect to the seed rod holding member.

According to the manufacturing apparatus of polycrystalline silicon of the present invention, the polycrystalline silicon is deposited also on the lower-end portion of the seed rod holding member since the temperature of the seed rod holding member is maintained high. Therefore, the deposited polycrystalline silicon is surely supported and prevented from falling down. In this case, although the polycrystalline silicon is deposited on the electrode, the polycrystalline silicon can be prevented from adhering to the heat cap since the cap protector covers the upper surface of the heat cap. Therefore, it is not necessary to exchange the whole electrode when the process is terminated, so that at least the heat cap can be reused. As a result, the workability and the productivity of manufacturing polycrystalline silicon can be improved.

DETAILED DESCRIPTION OF THE INVENTION

Below, an embodiment of the present invention will be described with reference to drawings.

Figure 1:
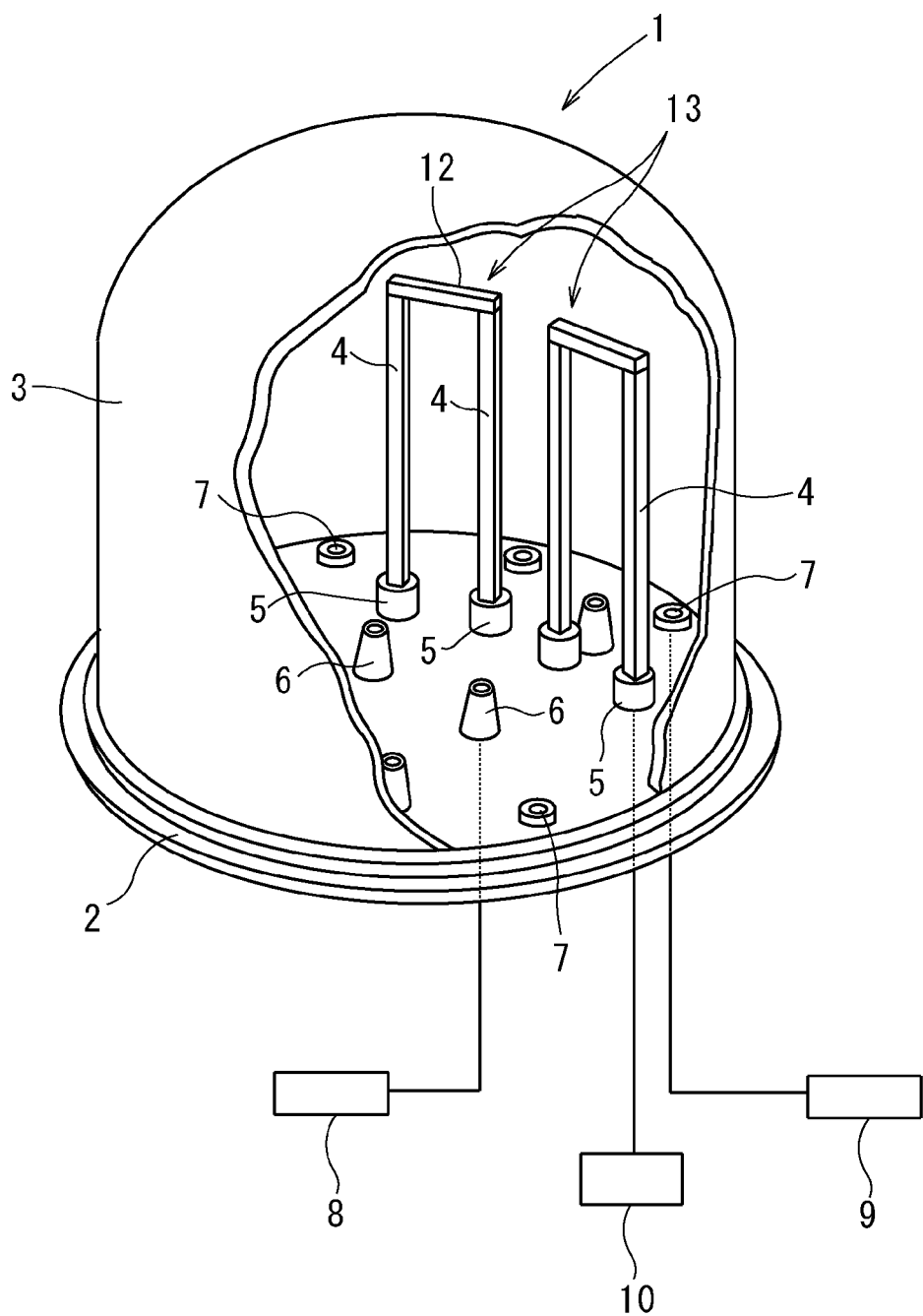
FIG. 1 is a partially cutaway perspective view of a bell jar of a reactor.

FIG. 1 is an overall view of a manufacturing apparatus of polycrystalline silicon of the present invention. A reactor 1 of the manufacturing apparatus of polycrystalline silicon is provided with: a bottom plate portion 2 which forms a furnace floor; and a bell jar 3 which is detachably attached to bottom plate portion 2. The upper surface of the bottom plate 2 is substantially a flat horizontal surface. The bell jar 3 has a hanging-bell shape as a whole, and a roof thereof is domical. Therefore, an inner space of the bell jar 3 is the highest at a center portion, and is the lowest at a peripheral portion. The bottom plate portion 2 and a wall of the bell jar 3 form a jacket structure (not illustrated), and are cooled by coolant.

A plurality of electrode units 5 to which silicon seed rods 4 are attached, a plurality of injection nozzles (i.e., gas-supply ports) 6 to inject raw-material gas including chlorosilane gas and hydrogen gas into the reactor 1, and a plurality of gas-discharge ports 7 are formed on the bottom plate portion 2.

The injection nozzles 6 of the raw-material gas are provided on substantially the entire area of the upper surface of the bottom plate portion 2 of the reactor 1 with appropriate intervals so as to supply the raw-material gas uniformly to every silicon seed rods 4. The injection nozzles 6 are connected with a raw-material gas supply source 8 which is placed outside of the reactor 1. The gas-discharge ports 7 are circumferentially arranged with appropriate intervals on the outer peripheral portion of the bottom plate portion 2, and are connected with an exhaust gas disposal system 9. The electrode units 5 are connected with a power supply circuit 10. The bottom plate portion 2 has a jacket structure in which a coolant passage (not illustrated) is formed therein.

The silicon seed rods 4 are fixed to the electrode units 5 by inserting the lower end portions of the silicon seed rods 4 in the electrode units 5, thereby extending upward. Short connection members 12 are fixed on the upper end portions of pairs of the silicon seed rods 4 so as to connect the two silicon seed rods 4. The connection members 12 are made of the same silicon as the silicon seed rods 4. A seed unit 13 is assembled from the two silicon seed rods 4 and the one connection member 12 connecting the silicon seed rods 4 so as to form a Π shape. These seed units 13 are arranged substantially concentrically by arranging the electrode units 5 concentrically around the center of the reactor 1.

Figure 2:
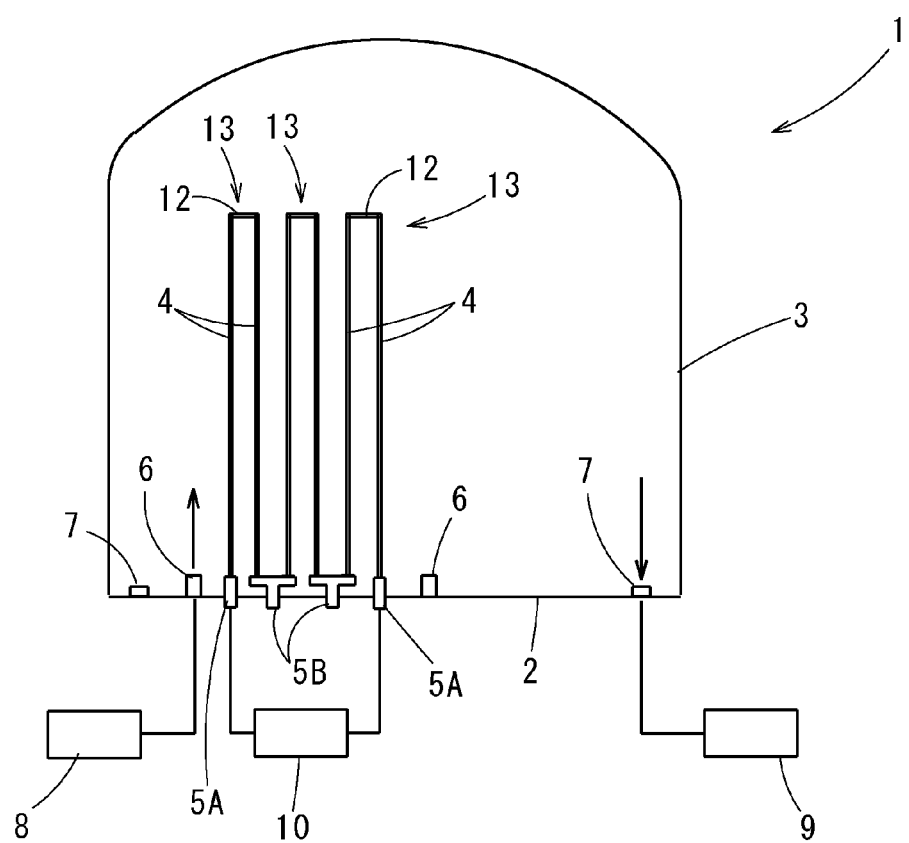
FIG. 2 is a schematic sectional view of the reactor of FIG. 1.

More specifically, as shown in FIG. 2, single electrode units 5A holding the one silicon seed rod 4 and double electrode units 5B holding the two silicon seed rods 4 are mounted as the electrode units 5 in the reactor 1.

As shown in FIG. 2, the single electrode units 5A and double electrode units 5B are disposed so as to connect three seed units 13 in series as one unit by arranging from one end to the other end of the unit in sequence of one single electrode unit 5A, two double electrode units 5B, and the other single electrode unit 5A. In this case, three pairs of the seed units 13 are disposed so as to span four electrode units 5A and 5B. Each of the silicon seed rods 4 of one seed unit 13 is held by another electrode.

That is, the single electrode unit 5A holds one silicon seed rod 4 of two silicon seed rods 4 of the seed unit 13; and the double electrode unit 5B holds each one of the silicon seed rods 4 of two seed units 13. Further, an electric cable is connected to the single electrode units 5A, i.e., both ends of the series are connected, so that electric current flows.

In the manufacturing apparatus of polycrystalline silicon constructed as above, the silicon seed rods 4 are resistively heated by applying electricity to the silicon seed rods 4 from the electrode units 5 (5A and 5B). Furthermore, the silicon seed rods 4 are heated each other by radiant heat of the adjacent silicon seed rods 4, and are highly-heated synergistically. The raw-material gas is in touch with the surface of the highly-heated silicon seed rods 4 and reacted, so that polycrystalline silicon is deposited.

Figure 3:
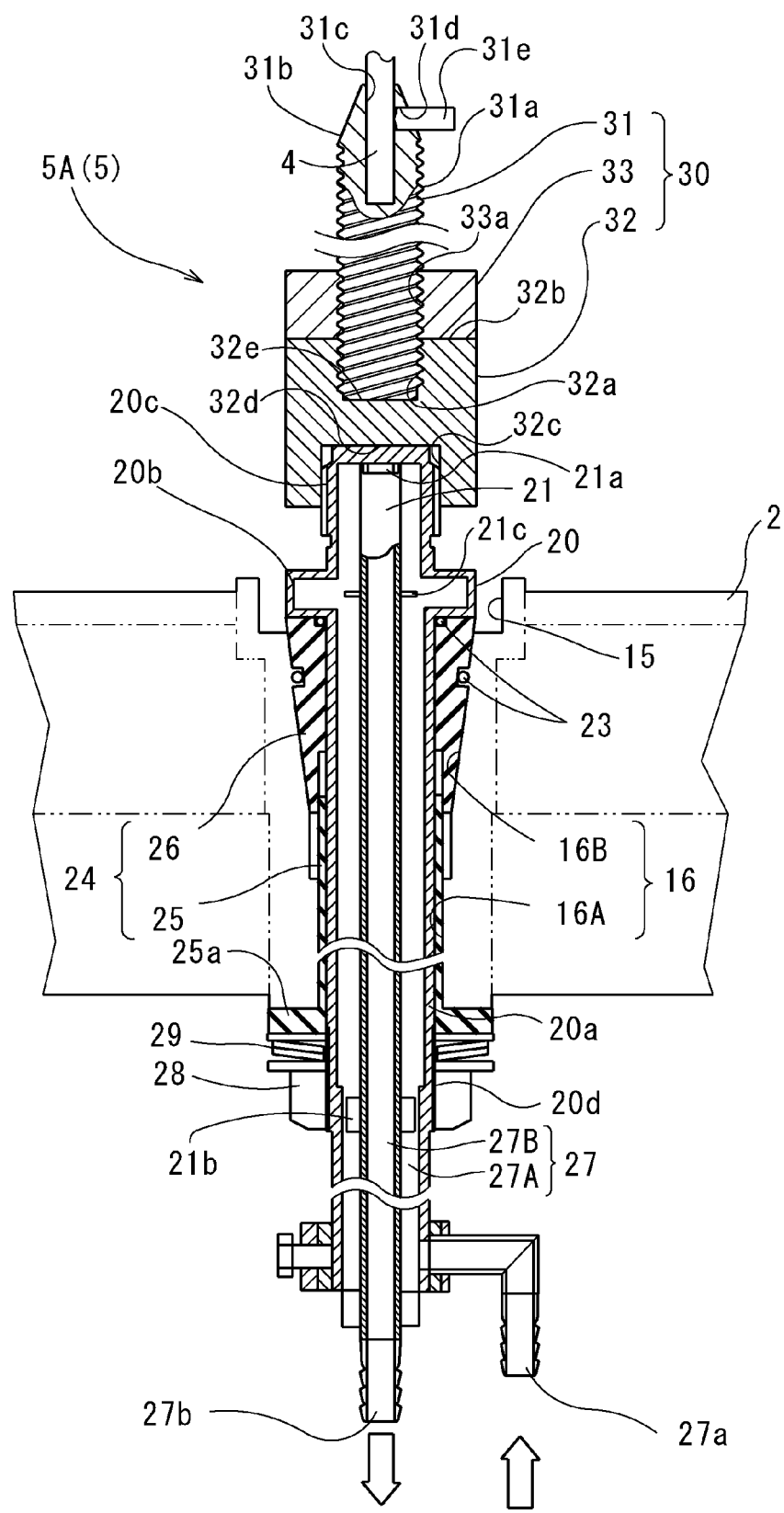
FIG. 3 is an enlarged sectional view of a single electrode of the reactor of FIG. 2.

Next, the single electrode unit 5A will be described. As shown in FIG. 3, the single electrode unit 5A holding one silicon seed rod 4 is constructed from: an electrode holder 20 which is inserted in a through hole 16 formed on the bottom plate portion 2 of the reactor 1; and an electrode 30 which is provided on the upper end portion of the electrode holder 20 and holds the silicon seed rod 4.

As shown in FIG. 3, the electrode holder 20 is a rod-like member made of stainless steel, and has a straight rod portion 20a which is inserted in the through hole 16 along substantially vertical direction. A hollow disk-shaped enlarged diameter portion 20b having the larger diameter than that of the rod portion 20a and an inner space therein, and a threaded shaft portion 20c which protrudes upward from the upper surface of the enlarged diameter portion 20b are formed on the upper end portion of the rod portion 20a integrally. A male screw portion 20d is formed on the lower portion of the rod portion 20a protruding from the bottom plate portion 2.

The electrode holder 20 is hollow, and has an inner tube 21 which is provided concentrically with the electrode holder 20. The inner tube 21 has the smaller external diameter than the internal diameter of the electrode holder 20, and separates the inside of the electrode holder 20 into the outer peripheral space and the inner space (i.e., a center part). The upper end of the inner tube 21 is in contact with the upper end inner surface of the electrode holder 20. The inner tube 21 has an opening portion 21a communicating the inside to the outside of the inner tube 21 that is formed at the upper end portion thereof. Thus, inside the electrode holder 20, from the rod portion 20a to the threaded shaft portion 20c, a coolant passage 27 is formed by communicating an outer peripheral flow passage 27A and an inner peripheral flow passage 27B via the opening portion 21a. The outer peripheral flow passage 27A is formed between the inner tube 21 and the electrode holder 20. The inner peripheral flow passage 27B is formed in the inner tube 21. Coolant medium flows in the coolant passage 27.

A spacer 21b is provided on the outer peripheral surface of the inner tube 21 extending along an axial direction of the inner tube 21 so as to maintain a space between the inner peripheral surface of the electrode holder 20 and the outer peripheral surface of the inner tube 21 at a corresponding height to the male screw portion 20d.

In the coolant passage 27, as shown by arrows in FIG. 3, the coolant medium flows into the outer peripheral flow passage 27A through an inlet 27a formed at the lower end portion of the electrode holder 20, and flows upward. Then, the coolant medium is guided by a ring plate 21c, and flows in the enlarged diameter portion 20b. The ring plate 21c is provided on the outer peripheral surface of the inner tube 21 so as to be orthogonal to the axis of the inner tube 21 at the corresponding height to the inner space of the enlarged diameter portion 20b. Then, the coolant medium reaches inside the threaded shaft portion 20c, i.e., the vicinity of the electrode 30. The coolant medium fills the outer peripheral flow passage 27A, and is in contact with the inner surface of the upper end portion of the electrode holder 20. Then, the coolant medium flows into the inner tube 21 through the opening portion 21*a* formed at the upper end portion of the inner tube 21, and flows downward along the inside of the inner tube 21, i.e., the inner peripheral flow passage 27B. Finally, the coolant medium flows out to the outside of the electrode holder 20 through an outlet 27*b* provided at the lower end portion of the inner tube 21. That is, the coolant medium cools down the enlarged diameter portion 20*b* which is comparatively in low temperature while flowing in the outer peripheral flow passage 27A. Then, the coolant medium cools down the vicinity of the electrode 30 which is comparatively in high temperature, and is discharged from the electrode holder 20 via the inner peripheral flow passage 27B.

The through hole 16 of the bottom plate portion 2 in which the electrode holder 20 having the coolant passage 27 is inserted is formed of a straight portion 16A at the lower part and a taper portion 16B at the upper part. The taper portion 16B is expanded in diameter upwardly. The straight portion 16A is formed so as to have the larger internal diameter than the external diameter of the rod portion 20*a*. Therefore, a ring-shape space is formed around the rod portion 20*a*. The taper portion 16B is, For example, formed so as to have an inclined angle of 5° to 15° with respect to a vertical axis. A counter boring portion 15 having a larger diameter than the maximum internal diameter of the taper portion 16B is formed on the bottom plate portion 2 around the upper end opening portion of the taper portion 16B.

A annular insulation member 24 is provided so as to surround the electrode holder 20 between the inner peripheral surface of the through hole 16 and the rod portion 20*a* of the electrode holder 20. The annular insulation member 24 is made of insulating resin having high-melting point such as fluorinated resin which is typified by, for example, polytetrafluoroethylene (PTFE), perfluoro alkoxyl alkane (PFA). The annular insulation member 24 is constructed from two members; a flanged sleeve 25 which is inserted in the straight portion 16A of the through hole 16, and a cone member 26 which is disposed in the taper portion 16B of the through hole 16. For example, PTFE which is used as a material of the annular insulation member 24 has a melting point of 327° C. (ASTM D792), a flexural modulus of 0.55 GPa (ASTM D790), a tensile modulus of 0.44 GPa to 0.55 GPa (ASTM D638), and a coefficient of linear thermal expansion of $10 \times 10^{-5}$/° C. (ASTM D696).

The cone member 26 is formed in a taper shape so that the outer surface thereof has the same inclined angle as that of the inner peripheral surface of the taper portion 16B of the through hole 16. The cone member 26 is inserted in the through hole 16 from the upper side of the bottom plate portion 2, and is in contact with the inner surface of the taper portion 16B. The upper surface of the upper end portion of the cone member 26 is in contact with the lower surface of the enlarged diameter portion 20*b* of the electrode holder 20. The external diameter of the enlarged diameter portion 20*b* is set substantially the same as the maximum external diameter of the cone member 26, i.e., the external diameter of the outer surface of the upper end portion, so that the upper surface of the cone member 26 (i.e., the annular insulation member 24) is substantially entirely covered.

O-rings 23 are disposed on the outer peripheral surface and the inner peripheral portion of the upper end surface of the cone member 26. The airtightness between the cone member 26 and the electrode holder 20 and between the cone member 26 and the bottom plate portion 2, that is, the airtightness at the through hole 16 of the reactor 1 is maintained by the O-rings 23.

The flanged sleeve 25 inserted in the straight portion 16A so that a flange portion 25*a* which is formed integrally at the lower end portion of the flanged sleeve 25 is in contact with the rear surface of the bottom plate portion 2 of the reactor 1. The upper surface of the flange portion 25*a* is pressed to the rear surface of the bottom plate portion 2 by a nut 28 which is screwed into the male screw portion 20*d* of the electrode holder 20 with interposing washers 29 made of stainless steel therebetween.

By tightening the nut 28, the distance between the enlarged diameter portion 20*b* and the nut 28 is reduced. Therefore, the electrode holder 20 is pulled downward with respect to the bottom plate portion 2, so that the annular insulation member 24 is tightly held between the enlarged diameter portion 20*b* and the nut 28. Further, by the force tightly holding the annular insulation member 24, the outer peripheral surface of the cone member 26 is pressed to the inner peripheral surface of the taper portion 16B of the through hole 16, so that the annular insulation member 24 and the electrode holder 20 are fixed to the bottom plate portion 2 integrally. With checking the height position of the lower surface of the enlarged diameter portion 20*b* of the electrode holder 20 (i.e., the protruding height from the bottom surface of the counter boring portion 15), the screwed position of the nut 28 is adjusted so as not to short-circuit by the lower portion of the enlarged diameter portion 20*b* approaching the bottom plate portion 2.

In this fixed state, the upper end portion of the cone member 26 of the annular insulation member 24 slightly protrudes upward from the taper portion 16B of the through hole 16, and faces the inside of the counter boring portion 15. Therefore, the cone member 26 is predetermined to have the slightly larger external diameter at the upper end portion than the maximum internal diameter of the taper portion 16B so that the upper end portion of the cone member 26 is protruded from the bottom surface of the counter boring portion 15 and not protruded from the upper end portion of the counter boring portion 15.

The carbon electrode 30 is held on the upper end portion of the electrode holder 20 which is fixed to the bottom plate portion 2. The electrode 30 is provided with: a columnar seed rod holding member 31 which holds the lower end portion of the silicon seed rod 4; a heat cap 32 which is provided between the seed rod holding member 31 and the electrode holder 20, and which has a hollow portion 32*a* in which the lower-end portion of the seed rod holding member 31 is inserted so as to be held therein; and a cap protector 33 having a ring-like plate shape, which covers the upper surface of the heat cap 32, and has a through hole 33*a* which is penetrated by the lower-end portion of the seed rod holding member 31.

The seed rod holding member 31 is a substantially columnar member which is made of carbon, and has a male screw portion 31*a* on the outer peripheral surface thereof. Further, a taper portion 31*b* in which the diameter thereof is gradually reduced upward is formed at the top portion of the seed rod holding member 31. The male screw portion 31*a* is screwed with the female screws which are formed on the inner peripheral surface of the hollow portion 32*a* and on the inner peripheral surface of the through hole 33*a* of the cap protector 33. A cylindrical hollow portion 31*c* into which the silicon seed rod 4 is fitted opens at the top end of the taper portion 31*b*. Further, a screw hole 31*d* opens at the flank of the taper portion 31*b*. A screw member 31*e* is screwed into the screw hole 31*d* so as to fix the silicon seed rod 4 to the hollow portion 31*c*.

The heat cap 32 is a substantially columnar member made of carbon. The seed rod holding member 31 is screwed into the hollow portion 32*a* formed on an upper surface 32*b* of the heat cap 32. The heat cap 32 is held by the electrode holder 20 at a hollow portion 32c formed on the lower surface thereof. The hollow portion 32c has a female screw which screws together with the male screw of the threaded shaft portion 20c of the electrode holder 20, and is in contact with the upper end surface of the electrode holder 20 at a bottom surface 32d. The heat cap 32 is cooled by bringing the threaded shaft portion 20c in which the coolant medium flows into contact with the hollow portion 32c. However, the distance between the bottom surface 32d of the hollow portion 32c and a bottom surface 32e of the hollow portion 32a is large, so that the bottom surface 32d is kept away from the bottom surface 32e. Therefore, the cooling action by the electrode holder 20 is hard to reach to the seed rod holding member 31, so that the seed rod holding member 31 is not excessively cooled.

In order to certainly prevent the seed rod holding member 31 from being excessively cooled by the cooling action of the electrode holder 20, the heat cap 32 is formed, for example, so that the distance from the upper surface 32b to the bottom surface 32d of the hollow portion 32c is 0.8 to 3.0 times as large as the effective diameter of the female thread of the hollow portion 32c.

The cap protector 33 is a ring-shaped plate member made of carbon. The through hole 33a into which the male screw portion 31a of the seed rod holding member 31 is threaded is formed on the center of the cap protector 33. The cap protector 33 is disposed on the upper surface of the heat cap 32 so that the through hole 33a is concentric with the hollow portion 32a of the heat cap 32.

The seed rod holding member 31 is held by the heat cap 32 by screwing the lower end portion of the male thread portion 31a into the hollow portion 32a of the heat cap 32. Further, the cap protector 33 is screwed with the male thread portion 31a, and tightened so as to be pressed to the upper surface of the heat cap 32. Thus, the heat cap 32 and the cap protector 33 act as a double-nut with respect to the seed rod holding member 31, so that the thread of the male thread portion 31a is firmly fixed by the thread to the heat cap 32 and the cap protector 33. Therefore, the seed rod holding member 31 is firmly held by the heat cap 32.

When the cap protector 33 is screwed with the seed rod holding member 31, by adjusting the tightening extent with respect to the heat cap 32, the bending deformation of the seed rod holding member 31 can be allowed, thereby preventing the seed rod holding member 31 from breaking.

The electrode 30 and the silicon seed rod 4 constructed as above, in the deposition process of the polycrystalline silicon, are energized through the electrode holder 20 made of stainless steel, and is highly-heated by the resistive heat. In this process, the electrode holder 20 is cooled since the electrode holder 20 is made of stainless steel which may contaminate the silicon by the high temperature. The electrode 30 is not necessary to be cooled since the electrode 30 is made of carbon and does not contaminate the silicon though under the high temperature. Therefore, in the electrode 30, the temperature of the lower portion of the heat cap 32 is comparatively low since the heat cap 32 is cooled by the electrode holder 20. However, it is hard to cool the seed rod holding member 31 and the cap protector 33 since the heat cap 32 is interposed between the electrode holder 20 and them. Especially, the seed rod holding member 31 which holds the silicon seed rod 4 reaches a high temperature to fully the extent of the lower end portion thereof since separated from the electrode holder 20 by the heat cap 32. Therefore, the polycrystalline silicon is deposited on the entire surface of the silicon seed rod 4, and grows into a rod-shape. The polycrystalline silicon is deposited also on the high-temperature surface of the seed rod holding member 31. As a result, the silicon rod is firmly held by the polycrystalline silicon which is deposited on the seed rod holding member 31, and is prevented from being collapsed.

Figure 4:
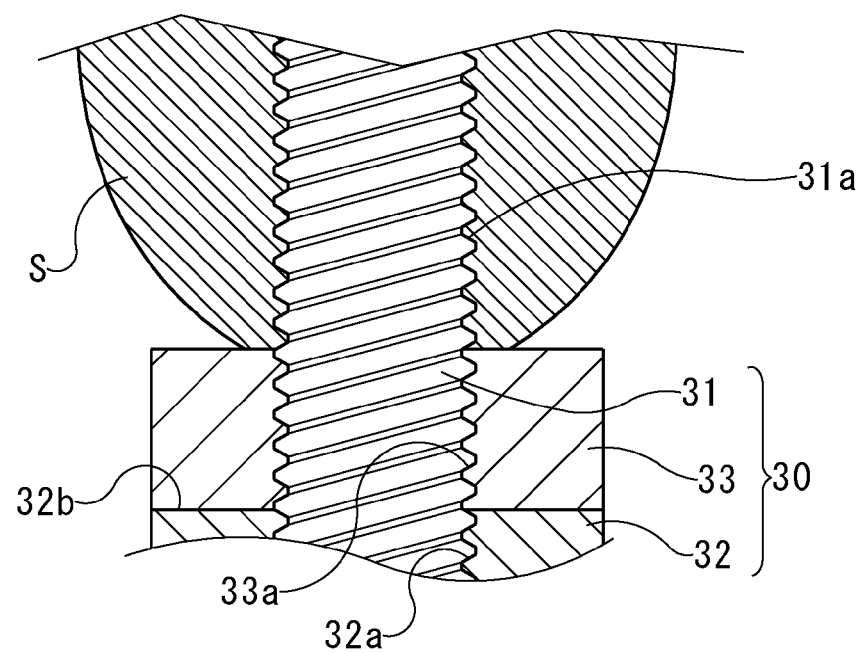
FIG. 4 is a sectional view showing a form at the lower portion of a silicon rod of deposited polycrystalline silicon.

Furthermore, as shown in FIG. 4, since the male screw portion 31a is formed on the outer peripheral surface of the seed rod holding member 31, polycrystalline silicon is deposited on the gap of the screw thread. Therefore, the grown polycrystalline silicon (i.e., a silicon rod S) can be effectively prevented from falling off. The silicon rod S is firmly held by the silicon seed rod 4 by adhering on the cap protector 33 to the extent of the upper surface.

The male screw portion 31a of the seed rod holding member 31 is screwed with the female screws of the heat cap 32 and the cap protector 33, and in surface contact with these female screws. Further, the upper surface 32b of the heat cap 32 is in contact with the lower surface of the cap protector 33 in plane-to-plane. Therefore, an energizing passage can be secured, so that the silicon seed rod 4 can be certainly heated even if the lower end portion of the seed rod holding member 31 is not in contact with the bottom surface 32e of the hollow portion 32c of the heat cap 32 owing to irregularity of the lower end surface of the seed rod holding member 31 or the bottom surface 32e of the hollow portion 32c of the heat cap 32 by poor fabrication.

The members for fixing the electrode holder 20 to the seed rod holding member 31 are assembled from two members, i.e., the heat cap 32 and the cap protector 33. Therefore, the thermal strain by temperature difference between the highly-heated upper portion and the cooled lower portion in the silicon rod can be reduced, so that the silicon rod S is prevented from breaking.

As described above, according to the manufacturing apparatus of polycrystalline silicon, the heat cap 32 which is made of carbon and not necessary to be cooled is disposed between the electrode holder 20 cooled by the coolant medium and the seed rod holding member 31 holding the silicon seed rod 4. Therefore, the seed rod holding member 31 is not easily cooled by the electrode holder 20, so that the silicon seed rod 4 can be surely heated to high-temperature.

Further, since the heat cap 32 and the cap protector 33 are screwed with the seed rod holding member 31 as a double-nut, the seed rod holding member 31 can be firmly fixed to the heat cap 32.

In addition, if the polycrystalline silicon is deposited on the lower part of the seed rod holding member 31, less the polycrystalline silicon adhere to the heat cap 32 since the heat cap 32 is covered by the cap protector 33. Therefore, the heat cap 32 can be easily reused. Further, by the cap protector 33, the heat cap 32 can be protected from breakage when the polycrystalline silicon is detached.

While preferred embodiments of the invention have been described and illustrated above, it should be understood that these are exemplary of the invention and are not to be considered as limiting. Additions, omissions, substitutions, and other modifications can be made without departing from the sprit or scope of the present invention. Accordingly, the invention is not to be considered as being limited by the foregoing description, and is only limited by the scope of the appended claims.

For example, the shape of the heat cap is substantially circular columnar in the above embodiment. However, the heat cap can be formed as a multangular column such as a rectangular column, a hexagonal column, or the like.

The upper surface of the cap protector is a flat face in the above embodiment. However, the upper surface of the cap protector can be made as a depressed surface, for example, a cone-shaped surface. If the cap protector has a depressed cone-shaped upper surface, the temperature of the depressed space can easily rise since the heat is accumulated there. Therefore, polycrystalline silicon can be deposited sufficiently on the base part of the seed rod holding portion.

The cap protector may be larger than the external diameter of the heat cap and covers the heat cap. In this case, the deposited polycrystalline silicon is prevented from adhering to the heat cap, so that the heat cap can be easily reused.

In the above embodiment, it is described that case in which the present application is applied to the structure holding one silicon seed rod at the upper end portion of the electrode holder. However, the present application can be applied to a structure of another type of electrode holder which is branched to two parts at the upper portion and holds two silicon seed rods.

What is claimed is:

1. A manufacturing apparatus of polycrystalline silicon by supplying raw-material gas to a heated silicon seed rod provided vertically in a reactor so as to deposit the polycrystalline silicon on a surface of the silicon seed rod, the manufacturing apparatus comprising:
    an electrode which holds the silicon seed rod and is made of carbon; and
    an electrode holder made of stainless steel, which is inserted and held in a through hole formed on a bottom plate portion of the reactor, which has a threaded shaft portion having a male screw and which holds the electrode,
    wherein a coolant passage in which coolant medium flows therein is formed in the electrode holder, and
    wherein the electrode comprises:
    a columnar seed rod holding member which holds a lower-end portion of the silicon seed rod;
    a heat cap which is provided between the seed rod holding member and the electrode holder, and which has a first hollow portion formed on an upper surface thereof, in which a lower-end portion of the seed rod holding member is inserted so as to be held therein and a second hollow portion formed on a lower surface thereof and having a female screw which screws together with the male screw of the threaded shaft portion of the electrode holder; and
    a cap protector having a ring-like plate shape, which covers an upper surface of the heat cap, and in which a through hole penetrated by the seed rod holding member is formed,
    wherein a male screw portion is formed on an outer peripheral surface of the seed rod holding member, and a female screw which screws together with the male screw portion is formed on an inner peripheral surface of the hollow portion of the heat cap, so that the male screw portion of the seed rod holding member is in surface contact with the female screw of the heat cap, and
    wherein a maximum outer diameter of the heat cap is larger than a maximum diameter of the seed rod holding member and substantially the same as a maximum diameter of the electrode holder at an exposed part in the reactor.

2. The manufacturing apparatus of polycrystalline silicon according to claim 1, wherein a screw which screws together with the male screw portion is formed on an inner peripheral surface of the through hole of the cap protector.

3. The manufacturing apparatus of polycrystalline silicon according to claim 1, wherein the second hollow portion formed on the lower surface of the heat cap is in contact with an upper end surface of the electrode holder at a bottom surface thereof.

4. The manufacturing apparatus of polycrystalline silicon according to claim 1, wherein a bottom surface of the first hollow portion is kept away from a bottom surface of the second hollow portion.

\* \* \* \* \*